United States Patent
Viswanadham et al.

[19]

[11] Patent Number: 6,163,827
[45] Date of Patent: Dec. 19, 2000

[54] METHOD AND APPARATUS FOR ROUND-ROBIN FLASH CHANNEL ARBITRATION

[75] Inventors: Krishna Viswanadham, Mountain View; Ranganathan Kothandapani, Sunnyvale, both of Calif.

[73] Assignee: Network Equipment Technologies, Inc., Fremont, Calif.

[21] Appl. No.: 08/991,254

[22] Filed: Dec. 16, 1997

[51] Int. Cl.[7] .................................................. G06F 13/00
[52] U.S. Cl. ........................ 710/111; 710/112; 710/113; 710/40; 710/118; 710/241; 710/244
[58] Field of Search ................... 710/111, 112, 710/113, 40, 241, 244, 118

[56] References Cited

U.S. PATENT DOCUMENTS

| | | | |
|---|---|---|---|
| 5,450,591 | 9/1995 | Palmer ..................................... | 710/113 |
| 5,548,762 | 8/1996 | Creedon et al. ........................ | 710/260 |
| 5,832,278 | 11/1998 | Pham ....................................... | 710/243 |
| 5,883,895 | 3/1999 | Davis et al. ............................. | 370/462 |

*Primary Examiner*—Ayaz R. Sheikh
*Assistant Examiner*—Rupal D. Dharia
*Attorney, Agent, or Firm*—Crosby, Heafey, Roach & May

[57] ABSTRACT

Round-robin arbitration circuit selects in clock cycle channel contending for arbitration; each arbitrated channel having channel number in sequence of channel numbers. Channel is designated as currently arbitrated; designated channel having designated number. Channels are masked from arbitration with designated channel, such that designated and unmasked channels are arbitrated to select channel. Channels having numbers sequenced after designated number are masked from arbitration, and channels having, numbers sequenced earlier than designated are also masked from arbitration. During subsequent cycle, designated channel is shifted to next channel in sequence of channel numbers by incrementing designated number. When designated number is last in sequence, designated channel is shifted to next having first number in sequence.

7 Claims, 4 Drawing Sheets

```
/******** Logic *****************************/
// EnL means low to high and EnH means high to low
// Algorithm for a 32 channel arbiter
always @(_cmdReg or _cmd) begin
    _cmdRegEnL[0] = 1;
    for (i = 1; i < 32; i = i+1)
        _cmdRegEnL[i] = _cmdRegEnL[i-1] & _cmdReg[i-1];
    _cmdRegEnH[31] = 1;
    for (i = 30; i = 0; i = i -1)
        _cmdRegEnH[i] = _cmdRegEnH[i+1] & _cmd[i + 1];
    for (i = 0; i < 32; i = i + 1) _cmdReg[i] = _iCmd[i] & _cmdRegEnH[i] & _cmdRegEnL[i];
end
```

```
/* ****The above logic is deduced from the following example for a 4-bit wide Arbiter.

assign _cmd0_reg = _iCmd0 & ~_cmd1 & ~_cmd2 & ~_cmd3;
assign _cmd1_reg = _iCmd1 & ~_cmd2 & ~_cmd3 & ~_cmd0_reg;
assign _cmd2_reg = _iCmd2 & ~_cmd3 & ~_cmd1_reg & ~_cmd0_reg;
assign _cmd3_reg = _iCmd3 & ~_cmd2_reg & ~_cmd1_reg & ~_cmd0_reg;

// Logic for 32-bit wide arbiter in expanded equations

```
assign   _cmdRegEnL[0]  = 1;
assign   _cmdRegEnL[1]  = ~_cmdReg[0]  & _cmdRegEnL[0];
assign   _cmdRegEnL[2]  = ~_cmdReg[1]  & _cmdRegEnL[1];
assign   _cmdRegEnL[3]  = ~_cmdReg[2]  & _cmdRegEnL[2];
assign   _cmdRegEnL[4]  = ~_cmdReg[3]  & _cmdRegEnL[3];
assign   _cmdRegEnL[5]  = ~_cmdReg[4]  & _cmdRegEnL[4];
assign   _cmdRegEnL[6]  = ~_cmdReg[5]  & _cmdRegEnL[5];
assign   _cmdRegEnL[7]  = ~_cmdReg[6]  & _cmdRegEnL[6];
assign   _cmdRegEnL[8]  = ~_cmdReg[7]  & _cmdRegEnL[7];
assign   _cmdRegEnL[9]  = ~_cmdReg[8]  & _cmdRegEnL[8];

assign   _cmdRegEnL[10] = ~_cmdReg[9]  & _cmdRegEnL[9];
assign   _cmdRegEnL[11] = ~_cmdReg[10] & _cmdRegEnL[10];
assign   _cmdRegEnL[12] = ~_cmdReg[11] & _cmdRegEnL[11];
assign   _cmdRegEnL[13] = ~_cmdReg[12] & _cmdRegEnL[12];
assign   _cmdRegEnL[14] = ~_cmdReg[13] & _cmdRegEnL[13];
assign   _cmdRegEnL[15] = ~_cmdReg[14] & _cmdRegEnL[14];
assign   _cmdRegEnL[16] = ~_cmdReg[15] & _cmdRegEnL[15];
assign   _cmdRegEnL[17] = ~_cmdReg[16] & _cmdRegEnL[16];
assign   _cmdRegEnL[18] = ~_cmdReg[17] & _cmdRegEnL[17];
assign   _cmdRegEnL[19] = ~_cmdReg[18] & _cmdRegEnL[18];

assign   _cmdRegEnL[20] = ~_cmdReg[19] & _cmdRegEnL[19];
assign   _cmdRegEnL[21] = ~_cmdReg[20] & _cmdRegEnL[20];
assign   _cmdRegEnL[22] = ~_cmdReg[21] & _cmdRegEnL[21];
assign   _cmdRegEnL[23] = ~_cmdReg[22] & _cmdRegEnL[22];
assign   _cmdRegEnL[24] = ~_cmdReg[23] & _cmdRegEnL[23];
assign   _cmdRegEnL[25] = ~_cmdReg[24] & _cmdRegEnL[24];
assign   _cmdRegEnL[26] = ~_cmdReg[25] & _cmdRegEnL[25];
assign   _cmdRegEnL[27] = ~_cmdReg[26] & _cmdRegEnL[26];
assign   _cmdRegEnL[28] = ~_cmdReg[27] & _cmdRegEnL[27];
assign   _cmdRegEnL[29] = ~_cmdReg[28] & _cmdRegEnL[28];

assign   _cmdRegEnL[30] = ~_cmdReg[29] & _cmdRegEnL[29];
assign   _cmdRegEnL[31] = ~_cmdReg[30] & _cmdRegEnL[30];

assign   _cmdRegEnH[31] = 1;

assign   _cmdRegEnH[30] = ~_cmd[31] & _cmdRegEnH[31];
assign   _cmdRegEnH[29] = ~_cmd[30] & _cmdRegEnH[30];
assign   _cmdRegEnH[28] = ~_cmd[29] & _cmdRegEnH[29];
assign   _cmdRegEnH[27] = ~_cmd[28] & _cmdRegEnH[28];
assign   _cmdRegEnH[26] = ~_cmd[27] & _cmdRegEnH[27];
assign   _cmdRegEnH[25] = ~_cmd[26] & _cmdRegEnH[26];
assign   _cmdRegEnH[24] = ~_cmd[25] & _cmdRegEnH[25];
assign   _cmdRegEnH[23] = ~_cmd[24] & _cmdRegEnH[24];
assign   _cmdRegEnH[22] = ~_cmd[23] & _cmdRegEnH[23];
assign   _cmdRegEnH[21] = ~_cmd[22] & _cmdRegEnH[22];

assign   _cmdRegEnH[20] = ~_cmd[21] & _cmdRegEnH[21];
assign   _cmdRegEnH[19] = ~_cmd[20] & _cmdRegEnH[20];
assign   _cmdRegEnH[18] = ~_cmd[19] & _cmdRegEnH[19];
assign   _cmdRegEnH[17] = ~_cmd[18] & _cmdRegEnH[18];
```

```
assign   _cmdRegEnH[16] = ~_cmd[17] & _cmdRegEnH[17];
assign   _cmdRegEnH[15] = ~_cmd[16] & _cmdRegEnH[16];
assign   _cmdRegEnH[14] = ~_cmd[15] & _cmdRegEnH[15];
assign   _cmdRegEnH[13] = ~_cmd[14] & _cmdRegEnH[14];
assign   _cmdRegEnH[12] = ~_cmd[13] & _cmdRegEnH[13];
assign   _cmdRegEnH[11] = ~_cmd[12] & _cmdRegEnH[12];

assign   _cmdRegEnH[10] = ~_cmd[11] & _cmdRegEnH[11];
assign   _cmdRegEnH[9] = ~_cmd[10] & _cmdRegEnH[10];
assign   _cmdRegEnH[8] = ~_cmd[9] & _cmdRegEnH[9];
assign   _cmdRegEnH[7] = ~_cmd[8] & _cmdRegEnH[8];
assign   _cmdRegEnH[6] = ~_cmd[7] & _cmdRegEnH[7];
assign   _cmdRegEnH[5] = ~_cmd[6] & _cmdRegEnH[6];
assign   _cmdRegEnH[4] = ~_cmd[5] & _cmdRegEnH[5];
assign   _cmdRegEnH[3] = ~_cmd[4] & _cmdRegEnH[4];
assign   _cmdRegEnH[2] = ~_cmd[3] & _cmdRegEnH[3];
assign   _cmdRegEnH[1] = ~_cmd[2] & _cmdRegEnH[2];
assign   _cmdRegEnH[0] = ~_cmd[1] & _cmdRegEnH[1];

assign   _cmdReg[0] = ~_clrCmd[0] &  _iCmd[0] & _cmdRegEnH[0] & _cmdRegEnL[0];
assign   _cmdReg[1] = ~_clrCmd[1] &  _iCmd[1] & _cmdRegEnH[1] & _cmdRegEnL[1];
assign   _cmdReg[2] = ~_clrCmd[2] &  _iCmd[2] & _cmdRegEnH[2] & _cmdRegEnL[2];
assign   _cmdReg[3] = ~_clrCmd[3] &  _iCmd[3] & _cmdRegEnH[3] & _cmdRegEnL[3];
assign   _cmdReg[4] = ~_clrCmd[4] &  _iCmd[4] & _cmdRegEnH[4] & _cmdRegEnL[4];
assign   _cmdReg[5] = ~_clrCmd[5] &  _iCmd[5] & _cmdRegEnH[5] & _cmdRegEnL[5];
assign   _cmdReg[6] = ~_clrCmd[6] &  _iCmd[6] & _cmdRegEnH[6] & _cmdRegEnL[6];
assign   _cmdReg[7] = ~_clrCmd[7] &  _iCmd[7] & _cmdRegEnH[7] & _cmdRegEnL[7];
assign   _cmdReg[8] = ~_clrCmd[8] &  _iCmd[8] & _cmdRegEnH[8] & _cmdRegEnL[8];
assign   _cmdReg[9] = ~_clrCmd[9] &  _iCmd[9] & _cmdRegEnH[9] & _cmdRegEnL[9];

assign   _cmdReg[10] = ~_clrCmd[10] &  _iCmd[10] & _cmdRegEnH[10] & _cmdRegEnL[10];
assign   _cmdReg[11] = ~_clrCmd[11] &  _iCmd[11] & _cmdRegEnH[11] & _cmdRegEnL[11];
assign   _cmdReg[12] = ~_clrCmd[12] &  _iCmd[12] & _cmdRegEnH[12] & _cmdRegEnL[12];
assign   _cmdReg[13] = ~_clrCmd[13] &  _iCmd[13] & _cmdRegEnH[13] & _cmdRegEnL[13];
assign   _cmdReg[14] = ~_clrCmd[14] &  _iCmd[14] & _cmdRegEnH[14] & _cmdRegEnL[14];
assign   _cmdReg[15] = ~_clrCmd[15] &  _iCmd[15] & _cmdRegEnH[15] & _cmdRegEnL[15];
assign   _cmdReg[16] = ~_clrCmd[16] &  _iCmd[16] & _cmdRegEnH[16] & _cmdRegEnL[16];
assign   _cmdReg[17] = ~_clrCmd[17] &  _iCmd[17] & _cmdRegEnH[17] & _cmdRegEnL[17];
assign   _cmdReg[18] = ~_clrCmd[18] &  _iCmd[18] & _cmdRegEnH[18] & _cmdRegEnL[18];
assign   _cmdReg[19] = ~_clrCmd[19] &  _iCmd[19] & _cmdRegEnH[19] & _cmdRegEnL[19];

assign   _cmdReg[20] = ~_clrCmd[20] &  _iCmd[20] & _cmdRegEnH[20] & _cmdRegEnL[20];
assign   _cmdReg[21] = ~_clrCmd[21] &  _iCmd[21] & _cmdRegEnH[21] & _cmdRegEnL[21];
assign   _cmdReg[22] = ~_clrCmd[22] &  _iCmd[22] & _cmdRegEnH[22] & _cmdRegEnL[22];
assign   _cmdReg[23] = ~_clrCmd[23] &  _iCmd[23] & _cmdRegEnH[23] & _cmdRegEnL[23];
assign   _cmdReg[24] = ~_clrCmd[24] &  _iCmd[24] & _cmdRegEnH[24] & _cmdRegEnL[24];
assign   _cmdReg[25] = ~_clrCmd[25] &  _iCmd[25] & _cmdRegEnH[25] & _cmdRegEnL[25];
assign   _cmdReg[26] = ~_clrCmd[26] &  _iCmd[26] & _cmdRegEnH[26] & _cmdRegEnL[26];
assign   _cmdReg[27] = ~_clrCmd[27] &  _iCmd[27] & _cmdRegEnH[27] & _cmdRegEnL[27];
assign   _cmdReg[28] = ~_clrCmd[28] &  _iCmd[28] & _cmdRegEnH[28] & _cmdRegEnL[28];
assign   _cmdReg[29] = ~_clrCmd[29] &  _iCmd[29] & _cmdRegEnH[29] & _cmdRegEnL[29];

assign   _cmdReg[30] = ~_clrCmd[30] &  _iCmd[30] & _cmdRegEnH[30] & _cmdRegEnL[30];
assign   _cmdReg[31] = ~_clrCmd[31] &  _iCmd[31] & _cmdRegEnH[31] & _cmdRegEnL[31];
always @(posedge CLK)_cmd <= _cmdReg;
```

FIG. 4B

… # METHOD AND APPARATUS FOR ROUND-ROBIN FLASH CHANNEL ARBITRATION

BACKGROUND OF INVENTION

1. Field of Invention

The invention relates to electronic networks, particularly to system, circuit, and methodology for arbitrating between channels of information.

2. Description of Background Art

Conventional electronic networking systems arbitrate between multiple channels to select one of many channels for processing at a given time. So-called "round-robin" or related arbitration schemes are well known. See U.S. Pat. No. 5,450,591 to Palmer for "Channel Selection Arbitration." Known channel arbitration techniques are limited in performance throughput, however, to the extent that such schemes depend on scanning all channels to find next available channel. In particular, known techniques do not guarantee fixed arbitration latency, which would be desirable in meeting certain latency requirements of high-performance networking equipment. Additionally, other conventional arbitration techniques employ wired-OR logic for determining channel priority and protocol. However, such techniques introduce more complexity to circuit implementation, as well as practically limit scalability when implemented using more than a few channels, wherein negotiation delays effectively prohibit high-speed clocking.

Hence, in high-performance network switching applications, very fast channel arbitration is desirable to meet certain latency requirements, there is a need for improved channel arbitration approach.

SUMMARY OF INVENTION

The invention resides in a round-robin flash arbitration circuit for selecting, preferably in single arbitration clock cycle, one of multiple channels contending for arbitration. Each channel is provided a channel number in a sequence of channel numbers. One channel is designated as currently arbitrated channel, the designated channel having a designated channel number. Then channels are masked from arbitration with the designated channel, such that the designated channel and an unmasked channel are arbitrated to select an arbitrated channel.

Preferably, channels having channel numbers sequenced after the designated channel number are masked from arbitration, and channels having channel numbers sequenced at least one earlier than the designated channel number are also masked from arbitration. During subsequent arbitration cycle, the designated channel is shifted to next channel in sequence of channel numbers by incrementing designated channel number. When designated channel number is last number in sequence of channel numbers, designated channel is shifted to next channel having first channel number in the sequence

BRIEF DESCRIPTION OF DRAWINGS

FIGS. 3A–B are representative high-level descriptions of logic according to present invention, particularly showing 32-channel arbiter (FIG. 3A) and 4-bit wide arbiter (FIG. 3B).

FIGS. 4A–B is representative high-level description of logic according to present invention, particularly showing 32-bit wide arbiter.

DETAILED DESCRIPTION OF PREFERRED EMBODIMENT

Figure 1:
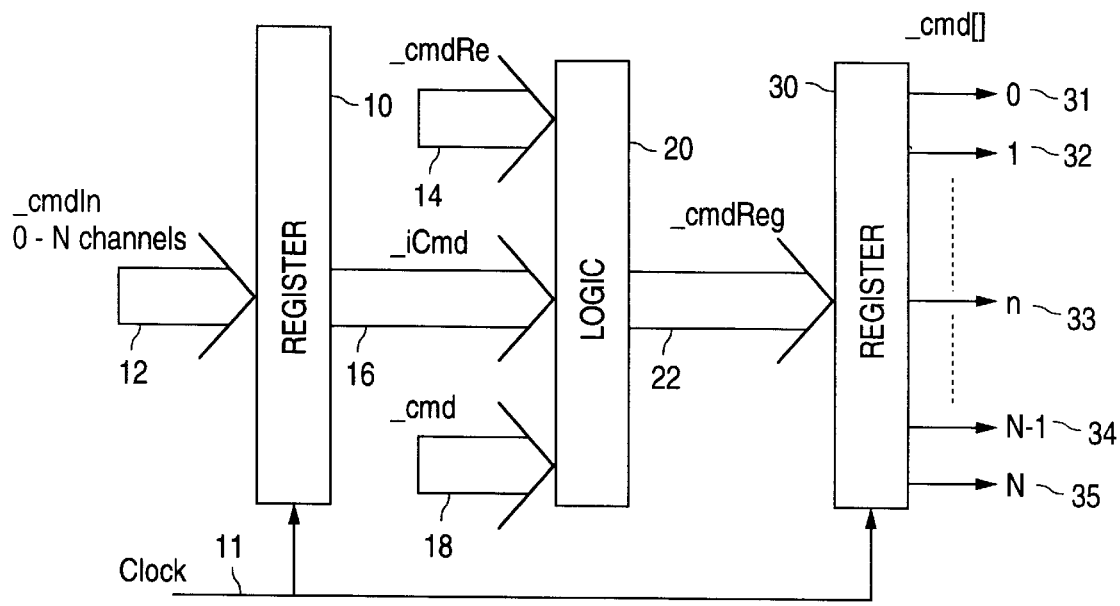
FIG. 1 is a top-level block diagram of round-robin flash channel arbitration data path for implementing present invention.

Preferred implementation of present invention arises in design or operation of electronic circuit or digital network equipment having multiple channels, signal paths or other discrete connection resources for round-robin-type arbitration, selection or multiplexing. In particular, high-speed or "flash" channel arbitration is achieved using innovative methodology for identifying, selecting, or allocating appropriate channel resource. As used herein, term channel is interpreted broadly to include any electronic path or connection for signal transmission.

Initially, preferably using arbitration electronics in particular embodiment described and configured herein, channel set including at least one available channel is provided contending for arbitration generally. In numerical sequence or other determinative assignment plan, channels are provided identifiable channel number or other predictable count. At current or other certain time slice, one or more channel may be designated as currently-arbitrated with corresponding channel number.

In accordance with important aspect of present invention for improving system performance, one or more channels are masked or restricted effectively from arbitration with or selective consideration against currently designated channel. Hence, improved arbitration is accomplished between designated and unmasked channels for selecting arbitrated channel. Preferably, flash round-robin arbitration mechanism is used to meet latency requirements in computer and networking systems. As used herein, masking term is interpreted broadly to include any electronic or logical operation or step to block or limit certain attribute, such as channel or channel number, from consideration, arbitration or other functional operation.

Preferably, those channels having channel numbers which are sequenced after the designated channel number are masked from arbitration; although, it is contemplated that channel numbering or sequencing could be inverted such that those channels having channel numbers which are sequenced before the designed channel number are masked from arbitration. Moreover, those channels having channel numbers which are sequenced at least one or other regular increment earlier or later than the designated channel number are masked from arbitration.

Optionally, foregoing steps for designating, masking, and arbitrating may be repeated individually or collectively during subsequent arbitration cycle. In this way, designated channel is shifted up or down to next channel in given sequence of channel numbers by incrementing or decrementing designated channel number.

Further, when designated channel number is last or selected end-identifying number in sequence of channel numbers, then designated channel may be shifted to next channel having first or begin-identifying channel number in such sequence.

Preferably, present invention provides that channel selection or arbitration procedure be accomplished with high performance (e.g., within single clock cycle time), such that there is virtually no appreciable arbitration delay in selecting next channel, particularly when next channel is positioned or logically accessed in adjacent position to current channel, or when there are multiple inactive channels disposed or logically accessed in between current and arbitrated channels.

Accordingly, whenever channel is arbitrated, preferably all channels below selected channel are masked from entering arbitration, and all channels above immediately next channel are also masked from arbitration. Using such masking scheme, immediately next channel above currently arbitrated channel is selected in next round arbitration. Further, after last channel is processed, first channel may be considered again. Foregoing logic is executed preferably during single clock cycle, thereby helping to ensure system compliance with required or maximum latency.

Note that in networking applications, where switches handle relatively high density of ethernet ports, for example, it is desirable, as implemented in inventive system, that arbitration delays be constrained to minimum so that full line rate may be maintained on each port, without increasing buffering individual channels, or dropping data being transferred.

Further, it is contemplated that present arbitration technique is useful for data communication or computing application, for example, wherein multiple agents or ports contend for limited channel resource. In such contentious applications, where resource may be shared or competed among multiple agents or ports, present arbitration scheme serves to provide high performance and system efficiency.

In FIG. 1, round-robin flash channel arbitration data path or system logic diagram is shown generally, preferably implemented in integrated or application-specific custom circuit for processing incoming digital signals or packet data as received. Initially, register stack 10 receive input N channels (_cmdIn) 12 to be arbitrated. Common clock signal 11 is applied synchronously to registers 10, 30, such that register stack 10 generate output signals (_iCmd) 16.

Optionally, clear signal (not shown) is applicable to register stacks 10, 30 to clear captured channel after arbitration. Moreover, enable signal (not shown) may be applied to register stack 10, for example, as control signal for opening input latch when capturing incoming channel data, preferably at regular time intervals upon capture, such signal not being enabled until all captured channels are serviced for arbitration.

Arbitration logic 20 receives output signals 16 as well as other command signals specified herein (_cmdRe,_cmd) 14, 18 to generate logic output signals (_cmdReg) 22, applied to register stack 30 and include N bits representing next channel to be arbitrated. For example, if bit corresponding to channel number is set to 1, then such channel is next arbitrated; all other bits are set 0, and single channel has corresponding bit set to 1. Thereafter, register stack 30 generates arbitrated output signals (_cmd[ ]) 31–35, which include N bits representing current channel selected.

Figure 2:
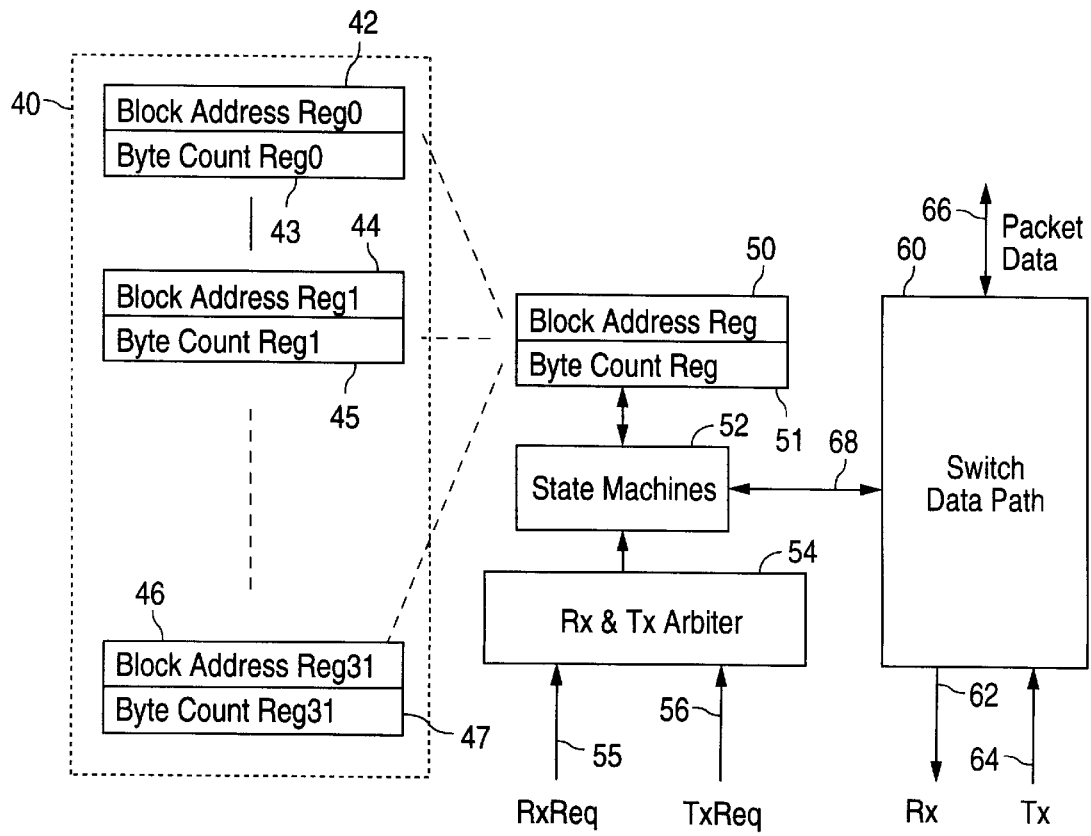
FIG. 2 is a functional diagram of arbitration scheme according to present invention.

In FIG. 2, functional and logic diagram of arbitration scheme, corresponding to simplified data path of FIG. 1, shows register files 40 including register stacks 10, 30 for RCVRs (i.e., logic for receiving data from network) and XMTRs (i.e., logic for sending data to network). As shown, register files 40 include multiple corresponding pairs of block address registers 42, 44, 46 and byte count registers 43, 45, 47, which interact according to present arbitration scheme with switch data path 60 associated with data path of FIG. 1.

Switch data path 60 provides transmit signal 62, receives receive signal 64, as well as communicates packet data 66. Moreover, switch data path 60 preferably interacts 68 with arbitration scheme through arbitration state machine 52 and Rx and Tx arbiter logic 54 coupled thereto, Which correspond with arbitration logic 20 of FIG. 1. As shown and specified herein, current channel information is provided in block address register 50 and byte count register 51 for arbitration.

Arbiter logic 54 receives RxReq signal 55, representing enumerated request from receive channel, and TxReq signal 56, representing enumerated request from transmit channel. Additionally, arbiter 54 logically includes Rx function for arbitration of receive data channels, and Tx function for arbitration of transmit data channels.

Substantially to reduce system latency, arbiter 54 Rx function services receive port requests in round-robin scheme for equalized distribution of channel or data path resource. Hence, when one receive port is under service, next request prioritization occurs preferably in parallel. Also, when certain channel wins arbitration, such channel is provided internal receive buffer allocated so that data may be staged from network or external bus, for example, as processed or transferred to memory. When buffer is granted, channel may be presented to network controller for data transfer.

Additionally, arbiter 54 Tx function services transmit port requests in round-robin scheme for equalized distribution of channel or data path resource. Overlapped or pipelined processing may be employed to improve system performance; for example, while transmit port is serviced, next request is prioritized in pipeline fashion. Moreover, when channel has data slice in data path, such channel is not permitted into arbitration procedure until associated data is placed in memory, thereby preventing occurrence of out-of-sequence data transfer.

Once channel wins arbitration, such channel may be presented to buffer allocation function or system controller (not shown) to access certain internal transmit buffer, preferably so that associated data may be staged from memory for transmission to network or external bus. Further, once transmit request wins arbitration, and transmit buffer allocated, channel may be presented to system or network controller (not shown) to obtain associated data from memory. In this regard, once data is staged in transmit buffers, buffers may request network controller to transfer such data in transmit buffers to network or external bus.

Further to illustrate preferred embodiment, FIGS. 3A–B provide according to Verilog format representative high-level logic descriptions, respectively showing 32-channel arbiter 70 and 4-bit wide arbiter 72. Furthermore, FIGS. 4A–B illustrate representative high-level logic description, showing 32-bit wide arbiter 74.

What is claimed is:

1. In an electronics circuit comprising a plurality of channels, a method for selecting one of the channels, the method comprising the steps of:

receiving a plurality of channels contending for arbitration, the plurality of channels having a currently arbitrated channel, an immediate next channel above the currently arbitrated channel, channels below the currently arbitrated channel, and channels above the immediate next channel;

masking channels below the currently arbitrated channel and the channels above the immediate next channel; and selecting the immediate next channel above the currently arbitrated channel in a next-round arbitration.

2. The method of claim 1 further comprising the step of:

repeating the designating, masking, and arbitrating steps during a subsequent arbitration cycle, wherein the currently arbitrated channel is shifted to a next channel in the sequence of channel numbers by incrementing a designated channel number.

3. The method of claim 2 wherein:

when the currently arbitrated channel number is a last number in the sequence of channel numbers, then the designated channel is shifted to a next channel having a first channel number in such sequence.

4. The method of claim 1 wherein:

the receiving, masking, and arbitrating steps occur in a single arbitration cycle.

5. An arbitration apparatus for selecting one of a plurality of channels, the apparatus comprising:

a first circuit for receiving a plurality of channels contending for arbitration, the plurality of channels having a currently arbitrated channel, an immediate next channel above the currently arbitrated channel, channels below the currently arbitrated channel, and channels above the immediate next channel;

a second circuit for masking the channels below the currently arbitrated channel, and the channels above the immediate next channel; and a third circuit selecting the immediate next channel above the currently arbitrated channel in a next-round arbitration.

6. The arbitration apparatus of claim 1 wherein:

the second and third circuits repeating the masking and arbitrating during a subsequent arbitration cycle, wherein the currently arbitrated channel is shifted to a next channel in the sequence of channel numbers by incrementing the currently arbitrated channel number.

7. The arbitration apparatus of claim 1 wherein:

when the currently arbitrated channel number is a last number in the sequence of channel numbers, then the currently arbitrated channel is shifted to a next channel having a first channel number in such sequence.

* * * * *